(12) United States Patent
El-Hennawey et al.

(10) Patent No.: US 7,729,275 B2
(45) Date of Patent: Jun. 1, 2010

(54) METHOD AND APPARATUS FOR NON-INTRUSIVE SINGLE-ENDED VOICE QUALITY ASSESSMENT IN VOIP

(75) Inventors: Mohamed El-Hennawey, Kanata (CA); Rafik Goubran, Ottawa (CA); Ayman M. Radwan, Kingston (CA); Lijing Ding, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 173 days.

(21) Appl. No.: 11/629,548

(22) PCT Filed: Jun. 15, 2005

(86) PCT No.: PCT/IB2005/001680

§ 371 (c)(1),
(2), (4) Date: Jan. 16, 2008

(87) PCT Pub. No.: WO2006/035269

PCT Pub. Date: Apr. 6, 2006

(65) Prior Publication Data

US 2008/0151769 A1  Jun. 26, 2008

Related U.S. Application Data

(60) Provisional application No. 60/579,703, filed on Jun. 15, 2004.

(51) Int. Cl.
*G01R 31/08* (2006.01)
(52) U.S. Cl. .................. 370/252; 370/230; 370/352; 370/253
(58) Field of Classification Search .............. 370/252, 370/253, 351–356
See application file for complete search history.

(56) References Cited

U.S. PATENT DOCUMENTS

| | | | | |
|---|---|---|---|---|
| 4,663,748 | A * | 5/1987 | Karbowiak et al. | 370/224 |
| 6,504,838 | B1 * | 1/2003 | Kwan | 370/352 |
| 6,798,745 | B1 * | 9/2004 | Feinberg | 370/235 |
| 2002/0061012 | A1 * | 5/2002 | Thi et al. | 370/352 |
| 2004/0160979 | A1 * | 8/2004 | Pepin et al. | 370/462 |
| 2005/0052996 | A1 * | 3/2005 | Houck et al. | 370/230 |

* cited by examiner

*Primary Examiner*—Ricky Ngo
*Assistant Examiner*—Iqbal Zaidi

(57) ABSTRACT

An apparatus (1240), method, and computer program to assess VoIP speech quality (130) using access to degraded signals. Different types of impairment (110) have different effect on speech quality. Preferred embodiments address two distinct types of impairment that are unique to VoIP: packet loss (230) and speech clipping in time (850).

12 Claims, 12 Drawing Sheets

METHOD AND APPARATUS FOR NON-INTRUSIVE SINGLE-ENDED VOICE QUALITY ASSESSMENT IN VOIP

CROSS REFERENCE TO RELATED APPLICATION(S)

This application claims the benefit of priority under 35 U.S.C. 119(e) of U.S. Provisional Application No. 60/579,703 filed Jun. 15, 2004.

TECHNICAL FIELD

This disclosure relates generally to voice-over-internet-protocol (VoIP) systems and more specifically to an apparatus, method, and computer program for voice quality assessment in a VoIP system.

BACKGROUND

VoIP is a promising technology that is expected to replace traditional telephone networks. Although VoIP is efficient, its speech quality is still less than what telephone users are accustomed to, due to packet loss, more perceived echo, excessive delay, and clipping. Network administrators need to maintain certain level of quality by monitoring speech quality of live calls for actions to be taken.

Subjective methods are unsuitable for live calls assessment. Objective intrusive methods mandate a reference signal, therefore cannot monitor live calls. The only suitable method is the E-model that estimates the speech quality based on statistics collected from the network.

The above discussion led VoIP service providers to implement a variety of techniques to enhance speech quality offered in VoIP. This resulted in a large number of providers offering services with competing prices and different levels of quality. The problem now changed to how to assess the quality of speech offered. Providers need methods to assess the performance of their services and compare it to services offered by competing providers. Engineers also need these methods to evaluate the newly developed techniques and compare it to old ones. Network administrators need methods to monitor the quality of speech transmitted through the networks, so they can take actions whenever the quality of speech degrades. Finally, the users also need these methods to compare the quality offered by different service providers.

One of the most important issues in VoIP these days is to measure the speech quality. Efforts have been focused to develop methods to measure the speech quality especially for VoIP. To measure the speech quality correctly, these methods have to reflect the human perception of speech quality. The most reliable approaches are the subjective methods. In these methods, a number of subjects (humans) rate the speech signals. The average of their ratings is calculated and is considered as the quality rate of the signal.

The most well known subjective test is MOS (Mean Opinion Score). Developers try to develop objective methods which give the same quality scores as MOS does.

Objective methods are those carried out by machines, without human interference. These methods are necessary for monitoring network performance since subjective methods cannot be used for this purpose. Most of the available objective methods are intrusive in nature. In these intrusive techniques, a reference signal is injected in the network from some point and received at another point. Since the original signal is known, the received degraded signal can be rated by comparing it to the original one. These techniques give relatively good estimates of MOS scores.

The most reliable and widely used of these methods are PAMS (Perceptual Analysis/Measurement System), PSQM (Perceptual Speech Quality Measurement) and PESQ (Perceptual Evaluation of Speech Quality).

Another approach is called non-intrusive. In this approach, no reference signal is injected in the network. Instead, the algorithm operates on signals that are present in the network or on the statistics collected from the network. The challenge in this technique is that the original signal is not known to the algorithm, so it cannot compare between original and degraded signals to assess the quality of the received signal. Some attempts are made in this approach but no robust algorithm is found.

The E-model is the leading method currently available that is considered non-intrusive. This model uses the statistics collected from the network during operation, such as the packet loss rate, delay, jitter estimates and signal to noise ratio, to estimate a quality score of the signal. This method is based on statistical nature, which does not guarantee accuracy. For example, statistically if packet loss rate is high, the quality score is low. But this is not always true, since the quality of the signal is still high, if most of the lost packets are in silence periods. Another non-intrusive method was recently developed. The idea is to estimate the original speech from the degraded counterpart. Then the two speech signals are compared to provide the quality assessment. This method, however, is seen to be inaccurate and very complex to implement.

There is, therefore, a need for a method which can monitor a live call and determines the quality of this call for its whole duration. These methods are needed to alert network administrator when the quality of the call is degraded, so some action can be taken to guarantee an acceptable quality of calls all the time. This method has to assess speech quality by examining degraded signals only without any information about original signals.

The reader is assumed to be familiar with the various current VoIP speech quality standards.

There is also a need in the art for an objective non-intrusive method to assess speech quality based on characteristics extracted from degraded signals and not statistics collected from the network.

SUMMARY

This disclosure provides an apparatus, method, and computer program to assess VoIP speech quality using access to degraded signals. Different types of impairment have different effect on speech quality. Preferred embodiments address two distinct types of impairment that are unique to VoIP: packet loss and speech clipping in time.

In one aspect, a method for voice quality estimation in a VoIP system comprises detecting an impairment in a received VoIP signal having a series of packets, where an original signal corresponding the received VoIP signal is not available; evaluating an amount of degradation in the received VoIP signal caused by the impairment; and estimating the voice quality of the received VoIP signal according to the amount of degradation.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
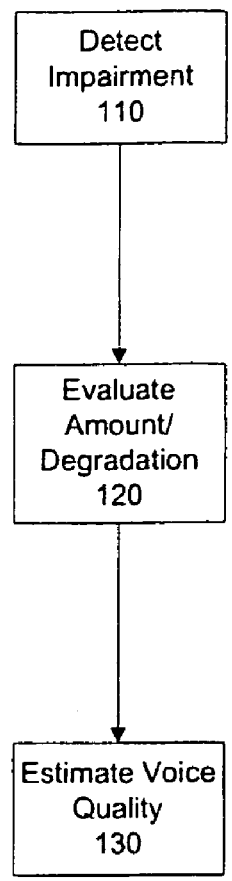
FIG. 1 depicts a flowchart of a broad process in accordance with an embodiment of the present invention.

FIGS. 1 through 11, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

This disclosure provides an apparatus, method, and computer program to assess VoIP speech quality using access to degraded signals. Different types of impairment have different effect on speech quality. Preferred embodiments address several distinct types of impairment that are unique to VoIP, including packet loss, speech clipping in time, and echo.

Preferably, the effect on speech quality resulting from each type of impairment is detected from the signals separately, and then the results of each analysis can be combined for an overall examination of speech quality. For each type of impairment, the following steps are followed using the degraded signal only: detection of the occurrence of the impairment; quantization of the degradation caused by this impairment; and mapping the amount of degradation to Perceptual Analysis/Measurement System (PAMS), Perceptual Speech Quality Measurement (PESQ), or Mean Opinion Score (MOS) score, all known to those of skill in the art.

MOS, PAMS, and PESQ scores, and other similar scores, can be used in this process. PAMS and PESQ are not necessarily the ideal scores to use, as they are not perfectly designed to accommodate for the impairments examined here. MOS is a better method, but is often not feasible here in terms of financial and time limitations. PAMS and PESQ scores are therefore typically the preferable scores to use.

Packet loss and clipping in time are two types of impairments whose effects are analyzed according to the techniques disclosed herein. Packet loss is one of the major problems in VoIP usually occurring at peak times due to congestion. Packet loss concealment techniques are usually used in the receivers to replace lost packets with some packets to decrease its degradation effect. The packet loss concealment techniques used here are the replacement of the lost packets with constant silence packets and the replacement of the lost packets with previous packets.

In such a process, first lost packets are detected and their locations are specified; a process that can be accomplished by header analysis. When lost packets are replaced with silence, lost packets are detected by the sudden drop in the energy of the signal. When lost packets are replaced with previous ones, lost packets are detected by the resemblance of successive packets.

The next step is to determine the degradation caused by these lost packets. In case of the first packet loss concealment technique, the degradation caused by the lost packet is determined by the amount of energy estimated in the lost packet. In case of the second technique, the amount of degradation caused by each lost packet is determined by the location of the lost packet, whether this packet falls in silence, voiced or unvoiced period. If the packet falls in silence period, it does not affect speech quality. Packets lost from voiced periods degrade the signal more than those lost from unvoiced periods. At the end, these factors are mapped to PESQ score with different weighting to estimate the quality score of degraded signals accurately.

Clipping in time usually occurs because of the usage of VAD (Voice Activity Detection) and nonlinear processor (NLP) in echo cancellers. VAD is usually used in VoIP to save bandwidth when there is silence. Echo cancellers usually estimate the echo and subtract it from the received signal. If any of these two techniques is not of very high performance, the signal is clipped in time. This means that some parts of the signal are silenced, as described herein. Depending on the threshold value of the VAD, the amount of degradation in the signal is predicted. Mapping threshold value of VAD to PESQ score, a quality score can be estimated. Two methods are suggested to estimate the VAD threshold value. The first method depends on the procedure used in simulating the clipping effect. The second method depends on the statistics of the duration of speech and silence periods present in the degraded signal.

It may be advantageous to set forth definitions of certain words and phrases that are used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Other symbols used in the discussion herein include:
R Transmission rating factor
R0 The basic signal-to-noise ratio
Is The effect of simultaneous impairments
Id The impairments caused by delay
Ie Impairments caused by low bit rates codecs
A Expectation factor
f(r) Estimated degradation
r Percentage of total lost energy to the total energy of the signal
S(p) Estimated speech quality score
p Packet loss percentage
Acronyms used herein include:
VoIP Voice over Internet Protocol
IP Internet Protocol
MOS Mean Opinion Score
PAMS Perceptual Analysis/Measurement System
PSQM Perceptual Speech Quality Measurement
PESQ Perceptual Evaluation of Speech Quality
DSLA Digital Speech Level Analyzer
VAD Voice Activity Detection
NLP Nonlinear Processor
ITU-T International Telecommunications Union-Telecommunications
SID Silence Insertion Descriptor
QoS Quality of Service
PLC Packet Loss Concealment
DMOS Degradation Mean Opinion Score
ACR Absolute Category Rating
DCR Degradation Category Rating
LQ Listening Quality
LE Listening Effort FIG. 1 depicts a flowchart of a broad process in accordance with an embodiment of the present invention. These steps are discussed in more detail below.

The first step is detection of the impairment (step 110). In the examples below, lost packets and clipping are discussed in particular, but of course, other types of impairments can be detected.

Next is evaluation of the amount of degradation caused by this impairment (step 120).

The next step is estimation of the voice quality of this signal according to the amount of degradation calculated (step 130).

For modeling or other purposes, impairment can be deliberately introduced to the original signal, using MATHWORKS MATLAB or other program written specifically for each type of impairment. The exact method of simulating each type of impairment is unimportant to an understanding of the invention. After introducing the impairment to the signal, the occurrence of this impairment is detected based on the characteristics of the degraded signal only. Using a certain criteria based on the type of impairment, an amount of degradation is determined. A mapping of the amount of degradation to speech quality is formulated for each type of impairment. According to this mapping, the speech quality of the degraded signal is estimated based on the amount of degradation determined in the previous step.

These embodiments include a method to estimate the MOS score based on the introduction of packet loss. Packet loss is treated in VoIP by packet loss concealment techniques. Two types of these techniques are discussed, which are replacement of lost packets with constant silent packets and the replacement of lost packets with previous ones. Of course, a "silent" packet, as used herein, does not necessarily mean a complete absence of any sound, rather, it indicates a packet that does not indicate voice or any other significant sound. The method to detect the occurrence of packet loss in each case is discussed. The quantization of the amount of degradation caused by the packet loss is shown. Finally, the modeling of packet loss to PAMS or PESQ results is described.

Packet loss is one of the major problems facing VoIP. The causes of packet loss are known to those of skill in the art. Packet loss is usually treated by retransmission of lost packets in packet networks. This technique can be accepted in data transmission which can tolerate large delays. Speech, however, is a real time application, which is intolerable to large delays, thus retransmission of lost packets cannot be applied. Packet loss is unavoidable in speech transmission over packet networks. To decrease the degradation in the speech quality due to packet loss, packet loss concealment techniques are developed. These techniques try to replace the lost packets with other packets, in order to make packet loss invisible to users. Two common techniques are replacement of lost packets with silence packets and replacement of lost packets with the last received packet; those of skill in the art are also familiar with more sophisticated techniques, which can also be examined using the disclosed processes.

The technique used in this case is the replacement of the lost packets with zero packets or silence packets. Usually, these silence packets are not exactly zeros. They are noise-like packets with very low energy. This technique is not so efficient but its advantage is its simplicity, as it does not need any computational complexity. This technique is usually not used in today's codecs, but aids in understanding the behavior of packet loss and its effect on the speech quality and help in modeling the effect of packet loss when other packet loss concealment techniques are used.

The first step is to detect the occurrence of packet loss. When packets are lost during speech, there is a sudden drop in the energy. Therefore, monitoring the change in the energy of the degraded speech signals can be used to determine the occurrence of packet loss. In cases of extreme jitter, delayed out-of-order packets can be treated as lost packets.

Figure 2:
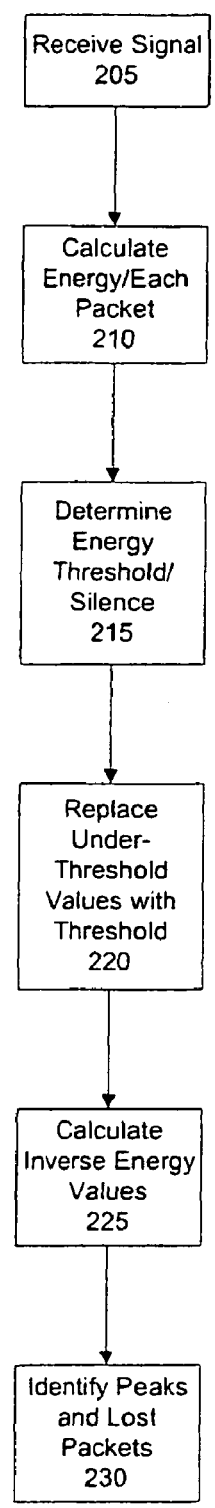
FIG. 2 depicts a flowchart illustrating the steps used to determine the occurrence of packet loss, in accordance with an exemplary embodiment of the present invention.

FIG. 2 depicts a flowchart illustrating the steps used to determine the occurrence and location of packet loss, in accordance with an exemplary embodiment of the present invention. First, the packet voice signal is received (step 205). Next, the average energy of each packet is calculated (step 210). Energy is usually calculated as the average of the squares of the amplitudes of the samples. In these examples, the sum of the absolute value of the amplitudes of the signal is used instead of the square of the amplitude. This gives better accuracy due to the format numbers are represented with.

Next, an energy threshold of silence is determined (step 215). This threshold can be evaluated depending on the nature of the signal and the surroundings. This threshold points out the silence packets and the lost packets, which are replaced with zeros or silence as well. This threshold is useful also because it allows the process to ignore packet loss when it occurs in silence periods. When packets are lost during silence periods, this should have no effect on the quality of speech.

Next, energy values less than this threshold are replaced with the threshold value (step 220). This step is used so that in the next step silence and lost packets will have the same inverse value. Also, this step avoids division by zero.

Next, the inverse of the energy of the packet voice signal is calculated (step 225). In this step, all silence and lost packets will have the same inverse values. For ease of visualization, the energy values and inverse-energy values can be graphed.

Peaks are identified, which indicate lost packets (step 230). If a packet is lost during a speech period and replaced with a zero packet, there will be a peak in the inverse of the energy graph. Whenever a peak occurs in the inverse of the energy, this indicates that a packet was lost and replaced with a zero packet. To determine if there is a peak, the value of this peak should be the inverse value of the energy threshold determined previously. Also, an assumption is made. This assumption is that no more than three successive packets can be lost; therefore the length of the peak is maximum three points.

Figure 3:
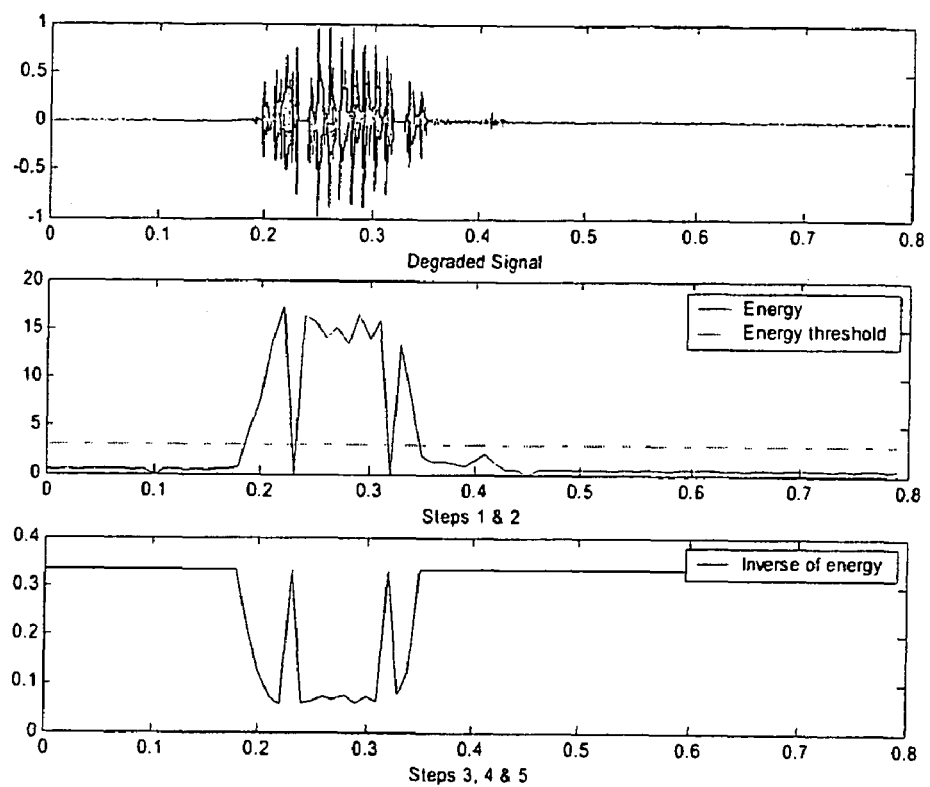
FIG. 3 depicts a series of graphs corresponding to the process of FIG. 2, in accordance with an exemplary embodiment of the present invention.

FIG. 3 depicts a series of graphs corresponding to the process of FIG. 2.

In FIG. 3, a series of graphs illustrating the steps to detect and locate the occurrence of lost packets when replaced by silence are show. In the first part, the degraded signal is shown. It can be seen that two packets are lost and replaced with silence. In the second part, the plot of the energy against time is shown. Also the energy threshold for silence used is shown. It can be seen that when the two packets are lost, there are two sudden drops in the energy plot. This two drops result in two peaks in the plot of the inverse of the energy which is shown in the third part of the figure. Since there are two peaks in the plot of the inverse of the energy, it can be said that there are two packets lost and replaced with silence.

Figure 4:
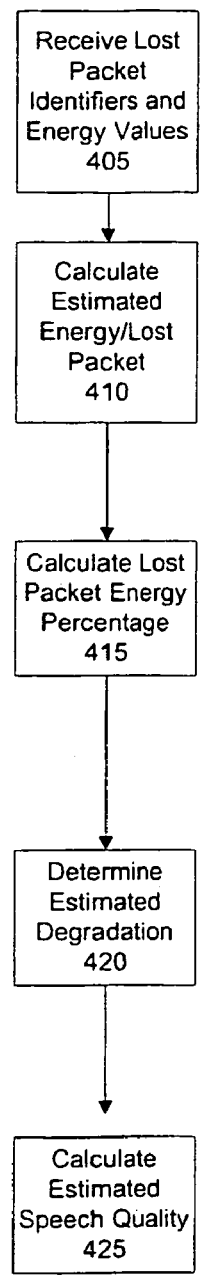
FIG. 4 depicts a flowchart of a process to determine the degradation of speech quality due to lost packets, in accordance with an exemplary embodiment of the present invention.

FIG. 4 depicts a flowchart of a process to determine the degradation of speech quality due to lost packets, in accordance with an exemplary embodiment of the present invention. First, of course, the identification of the lost packets and the packet energy values are received (step 405); such values were produced in the process of FIG. 2. The location of the lost packet determines its effect on the quality of the speech. Since in this case, the lost packets are replaced with zero packets, the energy of the lost packet determines the amount of degradation it causes. As the energy of the lost packet increases, the amount of degradation increases and vice versa. In reality, there is no access to the lost packets. Therefore, the estimate of the energy of the lost packet has to be calculated (step 410). A good estimation of this value is the average of the energies of the two packets before and after the lost one.

The energy of the lost packet is estimated using the estimation described above, as the average of the energies of the two packets before and after the lost packet. The percentage of the estimated lost energy to the total energy in the signal is calculated (step 415):

Percentage=((Estimated lost Energy)/(Total Energy) }*100

Next, determine the estimated degradation (step 420). The following formula plots the estimated degradation in an exemplary embodiment:

$$f(r) = -0.0026r^2 + 0.1396r + 0.0617$$

where r is the percentage of the estimated lost energy to the total energy in the signal. The output of this curve, f(r) is the estimated degradation in the speech quality score. The exemplary formulas provided herein are all based on regression analysis of specific cases. There is no general case, and each case can be analyzed using known regression-analysis techniques.

Next, calculate the estimated speech quality score (step 425). To calculate the estimated speech quality score the following equation is used, where the ideal score is 5 in this example:

Estimated score=5−Estimated degradation

Next, more than one lost packet is considered. Different packet loss percentages are applied to each original file. The percentages range from 0% to 15% in increment of 1%. This range is enough as usually available networks have packet loss percentages much less than 15%. In practice, a network with 15% packet loss is unacceptable. The steps are the same as the steps explained above for single packet loss. The energy of each lost packet is estimated.

Two approaches are described here, including individually calculating the degradation from each lost packet using the curve obtained previously and then summing all the degradations. The other approach is to add the estimated energies of all the lost packets together and use the percentage of this value to the total energy in the signal to calculate the degradation in the speech quality using the same curve. The second approach is more accurate, and so is preferable. This is expected, as the degradation caused by packet loss is not expected to be linear.

From losing one packet only in the whole signal file, the threshold of the silence could be enhanced. Actually here, the silence/speech determination is not the goal. The goal is to determine whether the lost packet affects the quality of speech or not. Therefore, this threshold is chosen to be 1.4. If the sum of the absolute amplitudes of the samples in a single packet of length 80 samples (10 ms, 8 KHz) is less than this threshold, this packet is considered silence packet.

When the percentage of the estimated lost energy to the total energy of the signal exceeds a certain value, the PAMS score reaches 1 (Minimum PAMS score). This value is experimentally found to be 34.5%.

When the percentage of the lost estimated energy increases, it is seen that the curve obtained before does not fit well to the actual PAMS results. From simulation results it is shown that it is better to fit another curve when the percentage exceeds 21.5%. Fitting another curve to the part where the percentage is between 21.5% and 34.5%. Therefore two polynomials are used in mapping the percentage to degradation value. The functions used are as follows:

$$f(r) = \begin{cases} 0 & r = 0 \\ -0.0026r^2 + 0.1396r + 0.0617 & 0 < r \le 21.5 \\ -0.0097r^2 + 0.6585r - 7.8238 & 21.5 < r \le 34.5 \\ 4 & r \ge 34.5 \end{cases}$$

where r is the percentage calculated and f(r) is the estimated degradation. The estimated quality score is:

Estimated quality score=5−f(r)

Using the disclosed methods, all packets lost and replaced with zero packets can be detected, except those occurred in silence periods or in very low energy periods which are ignored due to their ineffectiveness on the quality of speech. The exact effective packet loss percentage can be determined. The exact position of each lost packet can also be determined. A percentage of estimated lost energy and the total energy in the signal can be calculated. This percentage is used to estimate the PAMS score of this signal. This technique can estimate the PAMS score with an absolute error of value 0.3 with 72.5% confidence.

It is seen that the location of the lost packets in the signal has an effect on the degradation caused by these lost packets. Usually, in traditional available methods, packet loss rate is used blindly, without any information about the location of lost packets. The disclosed approach using the location of lost packets to determine the amount of degradation is seen to be more efficient.

Using the disclosed techniques, the MOS score estimated varies according to the estimated energy in the lost packet. This gives results which correlate more to the MOS scores estimated by PAMS. Also, this can be clearly seen, even if there is a large packet loss rate, most of the lost packets fall in silence periods. In this case, the disclosed method gives high estimated MOS score. Traditional methods give low scores because of the large packet loss rate. The disclosed method is more accurate, since lost packets during silence periods do not degraded the signal if MOS is correctly used. From this discussion, it is seen that locating lost packets is essential to get more accurate MOS scores.

Replacement of lost packets with previous packets: The packet loss concealment technique used in this case is the replacement of the lost packets with previous ones (the last received packet). In this technique, the receiver saves the last packet received. If a packet is lost, the receiver replaces it with the saved packet. This technique is seen to perform much better than the one used in the previous section.

Despite this fact, this technique is still implemented in some of the codecs which are used at present time. This technique is used for its simplicity. It has no computational complexity. It only needs memory that has enough space to save the last received packet. This prevents the extra delay caused by more efficient techniques to estimate the shape of the lost packets.

Detecting and locating the occurrence of packet loss: In this case, the lost packet is replaced with a previous one. Thus a repetition of a packet occurs. To determine the occurrence of packet loss in this case, the resemblance between successive packets is examined. To examine the degree of resemblance, cross correlation between successive packets is used. Cross correlation determines the degree of resemblance between successive packets. Cross correlation gives an array of values between −1 and 1. Each one of these values determines the resemblance between the two packets with a certain shift. Whenever this value is 1, these two packets are exactly the same with this time shift. Whenever this value is −1, these two packets are also exactly the same but with opposite signs. Whenever the value is 0 or near 0, these two packets are not related to each other by any means.

In the instant case, the only value that matters is when there is no shift. Depending on whether this value is near 1, 0 or −1, the degree of resemblance between the two packets is determined. If a packet is lost and replaced with a previous one, the value of cross correlation between these two packets, when there is no shift, should be very high near 1 (ideally 1).

Figure 5:
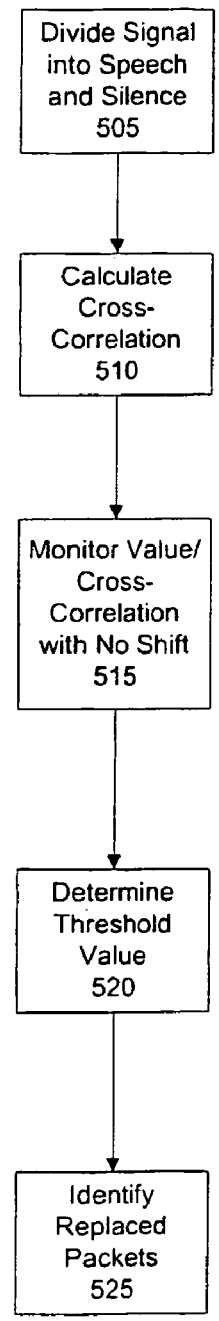
FIG. 5 depicts a flowchart of a process to determine if a lost packet has been replaced with a previous packet, in accordance with an exemplary embodiment of the present invention.

FIG. 5 depicts a flowchart of a process to determine if a lost packet has been replaced with a previous packet, in accordance with an exemplary embodiment of the present invention. The steps used are:

First, divide the signal into speech and silence periods using the energy threshold used above (step 505). This step is done to ignore the occurrence of packet loss during silence. During silence periods, packets are highly correlated, thus cross correlation between successive packets in silence periods is high. This step is also executed to prevent the algorithm from considering these packets as lost packets.

Next, the cross correlation between each two successive packets is calculated (step 510). The MATLAB built-in function for cross correlation, for example, can be used.

Next, the value of cross correlation with no shift is monitored for each two successive packets (step 515).

Next, a threshold for this value is determined (step 520). This threshold value has to be high enough, that it cannot result from two successive packets in normal speech. A value near 1 is chosen; 0.8 was used in one simulation. This value is seen to be a good threshold.

Next, the replaced packets are identified (step 525), as whenever the correlation is more than this threshold value, there is a lost packet replaced with the previous one, on condition that this occurred in speech period.

Figure 6:
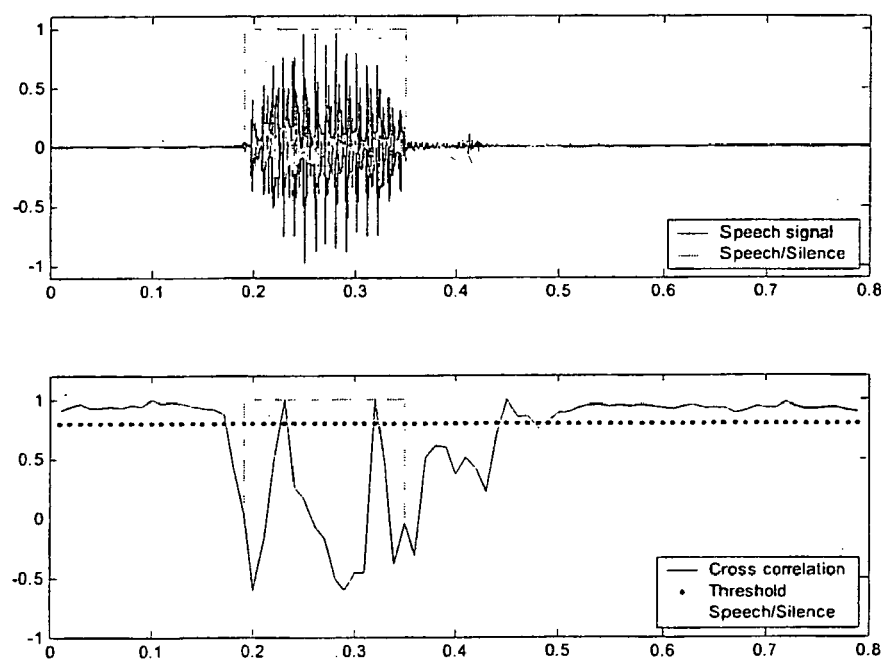
FIG. 6 depicts a series of graphs corresponding to the process of FIG. 5, in accordance with an exemplary embodiment of the present invention.

FIG. 6 depicts a series of graphs corresponding to the process of FIG. 5. In the first part, the degraded signal is shown. In the second part, the cross correlation with no shift is shown. Also the classification of the signal into speech and silence is shown, along with the threshold (0.8) which determines the occurrence of packet loss. It can be seen that this cross correlation exceeds the threshold twice during speech periods, which indicates that two packets are lost. It can also be seen that this correlation exceeds the threshold many times during silence periods, but since the signal is classified into speech and silence periods in the beginning of the method, these points are ignored.

Figure 7:
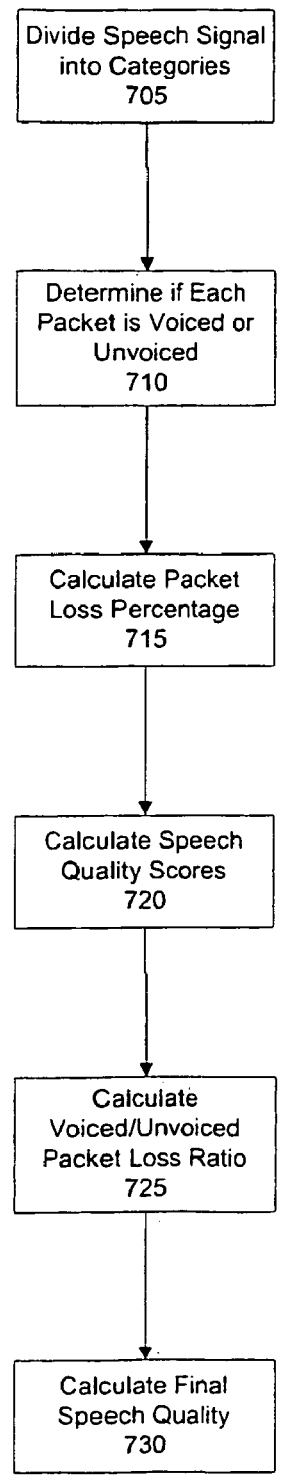
FIG. 7 depicts a flowchart of a process to determine the location of lost packets and a speech quality score, in accordance with an exemplary embodiment of the present invention.

FIG. 7 depicts a flowchart of a process to determine the location of lost packets and a speech quality score, in accordance with an exemplary embodiment of the present invention. As described above, the location of the lost packet determines the amount of degradation it causes to the speech quality of the signal. This process uses a different approach than the one using the estimated energy of the lost packet. The speech signal is divided into three categories (step 705). These three categories are silence, voiced and unvoiced periods. The amount of degradation caused by a lost packet is determined by the category of the speech in which it is located.

There are many algorithms used to classify the speech signals into silence/voiced/unvoiced segments, known to those of skill in the art. Any of these techniques can be used in the proposed algorithm.

Information about the location of each lost packet was used in determining its effect on the speech quality of the signal. Whether each lost packet falls in a voiced period or unvoiced period is determined (step 710), this information is used to determine the speech quality of the signal.

Next, the packet loss percentage p is calculated, as described above (step 715).

The effect of losing packets during voiced periods is greater than the effect of losing packets during unvoiced periods. It is preferable to determine the location of lost packets before estimating the degradation resulting from this packet loss. Two curves were are used to determine the estimated speech quality score S(p). One curve is used when all lost packets fall in unvoiced periods, and the other one is used when all lost packets fall in voiced periods. The curve when all lost packets fall in unvoiced periods has the following formula:

$$S(p) = -0.0007p^5 + 0.01p^4 - 0.0583p^3 + 0.175p^2 - 0.356p + 4.5$$

The curve when all lost packets fall in voiced periods has the following formula:

$$S(p) = -0.0023p^5 + 0.0338p^4 - 0.1908p^3 + 0.5713p^2 - 1.1818p + 4.5$$

After calculating the packet loss percentage, two speech quality scores are calculated using the two curves obtained (unvoiced only and voiced only) (step 720). The ratio of the number of packets lost during unvoiced periods and the number of packets lost during voiced is calculated (step 725). The two scores are added with the same ratio to estimate the final speech quality of the signal (step 730).

Clipping in time is another significant impairment addressed by the techniques disclosed herein.

Below, the effect and detection of signal clipping in time is discussed, including ways to quantize this clipping. Clipping cannot be assessed without processing the media payload. Therefore, the traditional E-model together with RTCP will not be able to take this factor in online voice quality evaluation.

The clipping effect: The clipping in the signal usually occurs in two different ways. One of them is clipping in amplitude and the other one is clipping in time. Clipping in time occurs in transmitting voice over packet switched networks due to the usage of VAD (Voice Activity Detection) in the transmitting side. Also, clipping occurs during double-talk when echo cancellers employ nonlinear processor (NLP).

VAD is used to save bandwidth when the user in the transmitting side is not talking. VAD usually scans the speech of the talker looking for the beginning and the end of speech periods. When VAD detects the beginning of a silence period the transmitter does not send packets continuously as usual. Instead, silence insertion descriptor (SID) frames are transmitted with very low frequency as long as there is silence. These frames are sent to update the receiver with the characteristics of the background noise present. Since packets are not sent as frequently as when there is speech, significant bandwidth is saved during silence periods when there is no important information to be sent. When the silence period ends and a speech period starts, the VAD detects this again, and the transmitter starts sending speech packets by the normal rate.

When VAD is not very precise, clipping occurs to the speech signals. In this case, the VAD classifies some speech packets as silence packets. Therefore, some parts of the speech are lost due to VAD. A similar clipping effect occurs when using a nonlinear processor (NLP) in echo cancellers. Because of the finite word length and the additive transmission noise, the canceller filter will not fully model the echo channel. Therefore, there will be uncancelled (residual) echo. This residual echo is still audible and in most cases causes annoyance to the user. Upon detecting that there is no speech from the other end (no double-talk), the canceller activates the NLP by placing a large attenuation to eliminate the residual echo. In cases, however, the double-talk detector falsely detects single-talk while there is double-talk present. In this case, clipping occurs and voice quality gets degraded. In the following discussion, while VAD is mentioned, the same argument applies equally to NLP.

Figure 8:
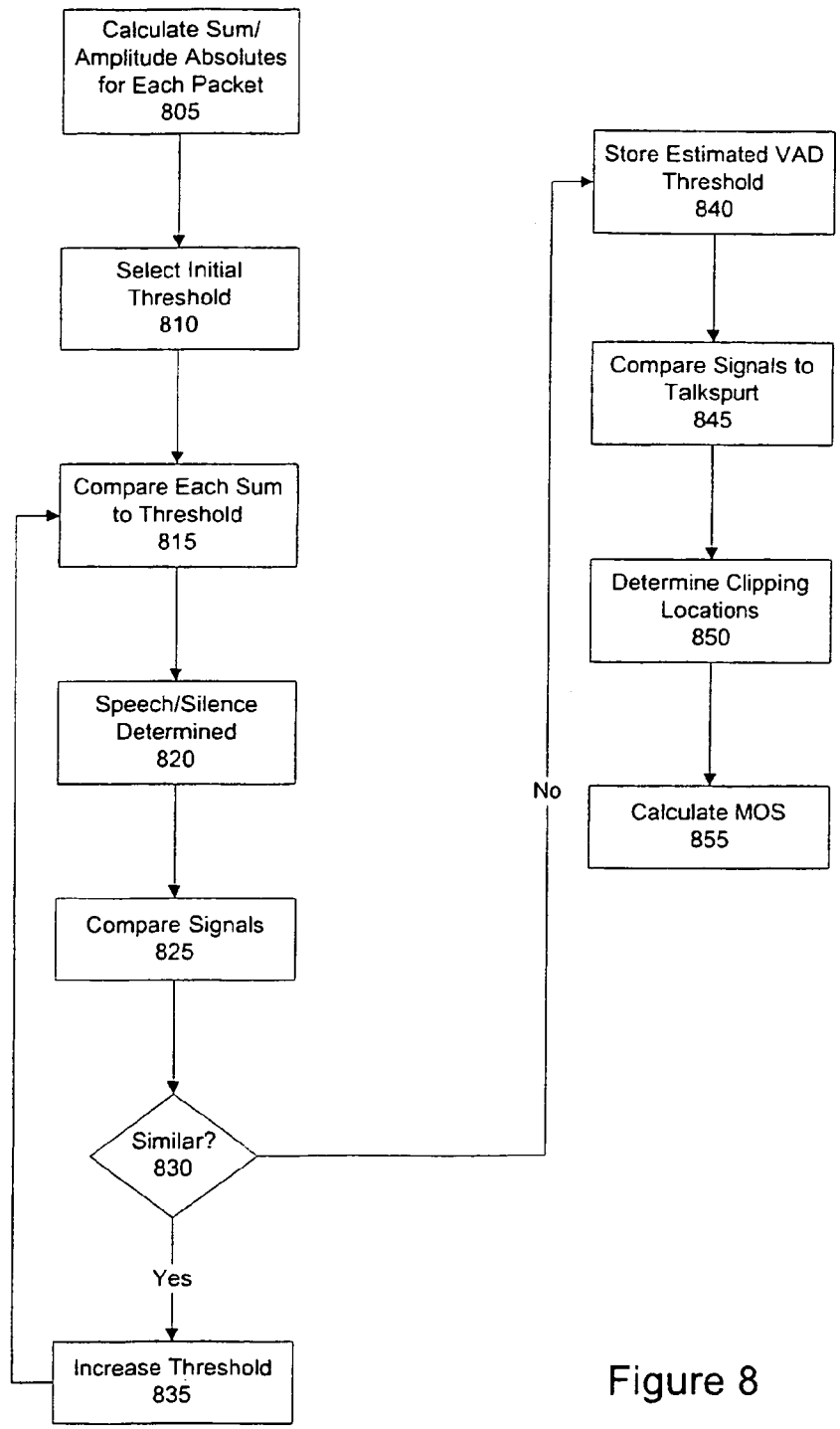
FIG. 8 depicts a flowchart of a process to assess voice quality of a clipped speech signal when the original reference is not available, in accordance with an exemplary embodiment of the present invention.

FIG. 8 depicts a flowchart of a process to assess voice quality in terms of estimating the MOS score of a degraded (clipped) speech signal when the original reference is not available, in accordance with an exemplary embodiment of the present invention. First, the sum of the absolute of the amplitudes of each packet is calculated (step 805). An initial threshold value for this sum is selected (step 810), as below. The sum value for each packet is compared with this threshold (step 815).

Next, each packet it determined to be speech or silence (step 820). If the sum value of the packet is equal to or greater than the threshold value, this packet is considered speech packet and is left unchanged. If this sum is less than the threshold value, this packet is considered silence packet and is replaced with all zero packet.

This threshold is changed along a range of values from 0 to 6, to simulate different levels of performance of VAD. Whenever this threshold is small, this results in less aggressive VAD. In this case, voice quality is maintained at the expense of bandwidth saving. Whenever this threshold increases the VAD becomes more aggressive, leading to more bandwidth saving at the expense of voice quality degradation.

First, quantify the relation between VAD threshold and the corresponding effect on MOS. Next, estimate, from the degraded speech, what threshold VAD has used. This will provide an estimate of MOS degradation due to clipping. Again, the PESQ is used here to estimate the MOS score.

The first step produces a mapping between the level of the threshold value used in VAD and the PESQ score. Increasing the threshold value used in VAD increases the degradation in the signal, resulting in decreasing the PESQ score. If the threshold value used in VAD is correctly estimated, the PESQ score of the degraded file will be estimated with an absolute error value of less than 0.3 with confidence of 78.5%. The probability of getting an absolute error value of more than 0.5 is not more than 5.5%. Therefore, it is important to estimate the threshold value used in VAD. Two approaches are disclosed. The first approach is based on the method used to simulate the VAD effect. The other approach is based on the statistics of the duration of speech and silence periods of the degraded signal.

Step-up Threshold Approach: This approach is based on the idea that if a threshold, which is lower than the VAD threshold, is applied on the degraded signal, the resulting signal will be the same as the degraded signal. Once applying a threshold a little bit greater than the VAD threshold, the resulting signal will differ from the degraded signal.

Therefore, continuing from step 820 above, the signal resulting from step 815 is compared to the original degraded signal (step 825). If the signals are substantially the same (step 830) the threshold is increased (step 835), and the process repeats. Preferably, the process starts from threshold value of zero, and increasing the threshold value by steps of 0.2, each time a new threshold is applied, the resulting signal is compared to the degraded signal. If there is no difference between the two signals, the threshold is increased further and the same procedure is repeated.

If the two signals start to differ (step 830), then this degraded signal resulted from a threshold value less than the one used in this step. More precisely, this signal resulted from a threshold value between this value and the threshold value used in the previous attempt. The accuracy of VAD threshold estimate depends on the resolution of threshold step size. The step size used here is 0.2 and it is seen to be adequate. The threshold at which the signals differed is stored as the VAD threshold estimate (step 840). The current voice/silence determinations are kept.

Human speech is composed of talkspurts separated by pauses or silences. In a long term, each speaker is only active no more than 50 percent during a conversation. The technique above produces the beginning and the end of the talkspurt on a frame basis. Accordingly, input speech frames are classified into active frames (talkspurt) or non-active frames (silence) by the VAD decision rules. The silence frame does not mean a frame of zero energy at all.

In reality, the background noise always presents, also, some fricative consonants have a very limited energy, they may be classified as non-active.

Based on locations, the VAD clippings can be classified into three categories: Front End Clipping (FEC), Middle Speech Clipping (MSC) and Back End Clipping (BEC).

By comparing the silent packets to the talkspurt (step 845), the percentage of packets that are clipped as FEC, MSC, and BEC is determined (step 850).

Finally, the estimated MOS is calculated (step is 855) as $$MOS = 4.55 - C1 \cdot FEC\% - C2 \cdot MSC\% - C3 \cdot BEC\%$$

where MOS is modeled as a linear combination of FEC %, MSC % and BEC %, and C1, C2 and C3 are weight coefficients. The optimum MOS is 4.55 without any clipping, which is derived from mapping the high-end of PESQ MOS, 4.50. Based on the degraded signal received, the coefficients in C1, C2, and C3 are found by using the linear regression.

Speech-Silence Duration Statistics Approach: This second approach is based primarily on the statistics of the duration of the silence and speech periods in degraded signals. As the VAD threshold value increases the durations of the speech periods tend to decrease, at the same time the durations of the silence periods tend to increase. In other words, more speech periods have shorter duration and more silence periods have longer-duration. Such statistics result from well known regression modeling.

As the threshold of VAD increases more speech periods have shorter duration and more silence periods have longer duration. The distribution of the duration of the speech periods tends to be narrower and more concentrated near the zero as the threshold of the VAD increases. The opposite occurs to the distribution of the duration of the silence periods.

Therefore, using these techniques, the effect of time clipping caused by VAD or NLP on voice quality is determined. The MOS score can be estimated when only the received degraded (clipped) speech is accessible. A two-step procedure is used. The first step models the MOS with regard to the energy threshold used in VAD or NLP. The result of the first step is tabulated and becomes ready to use when the speech signal is received with clipping. In the second step, the VAD (or NLP) threshold is estimated and then the MOS score is obtained from the available table. Two approaches can be used to estimate VAD/NLP threshold of the received signal.

The disclosed methods model the clipping effect based on the energy threshold used in VAD. This is done by estimating the VAD threshold and then mapping it to speech quality score. This technique is valid even when the VAD used does not use energy threshold to classify speech and silence periods. If the VAD uses other methods, even frequency based ones, when estimating speech quality of a certain period of the signal, the method will treat the signal as if it is the result of a VAD using energy threshold. Accordingly it will estimate the energy threshold that must have been used in VAD if it uses the energy threshold. Therefore, the proposed method will estimate the effect of the VAD with energy based that would have produced the same resulting signal as the one really used. At the end the signal produced is the same as the one that would have been produced using the VAD with energy threshold equals the threshold estimated by the proposed method. In sum, the method still can estimate speech quality independently on the type of VAD used.

Another common impairment in VoIP signals results from echo and echo cancellation techniques. The disclosed embodiments include a system and method to measure the effects of echo on speech quality. There are several kinds of echo that generally effect VoIP speech quality, known to those of skill in the art, including network echo, talker echo, listener echo (negligible when talker echo is well controlled), and acoustic echo.

Echo detection is necessary for measuring echo parameters (although they are stored in the EC), since these parameters are often unavailable at the measurement point, and the values may be different at the measurement point.

A preferred embodiment measures two parameters: echo path delay and echo path loss (EPL). In VoIP, this echo path delay could be very excessive (up to 1000 ms); all the traditional methods (such as cross correlation or adaptive filtering methods) are computationally intensive. The nonlinearity and the temporal clipping introduced by modern codecs invalidate the assumption of linear echo path, and affect the measurement. Also, the measurement performance suffers from the disturbances such as noise and double talk. The measurement results serve as the inputs to the echo model. As a speech quality estimate, less accurate measurement will not change the speech estimate significantly.

The preferred embodiment therefore provides a simpler implementation of echo measurement that greatly reduces the computation complexity while keeping good measurement accuracy.

Figure 9:
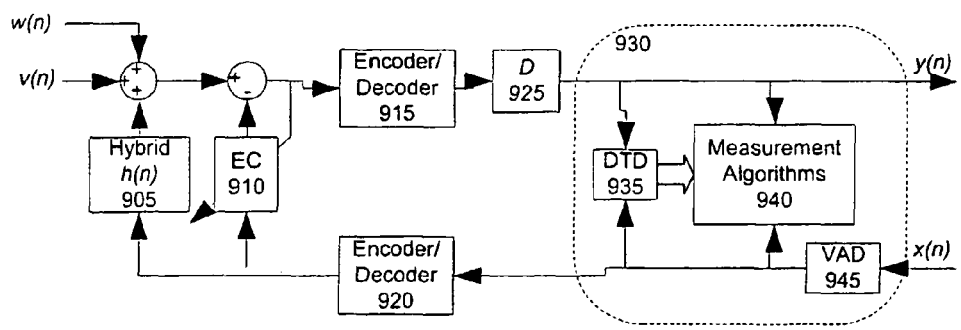
FIG. 9 depicts a block diagram of an echo detector in accordance with an exemplary embodiment of the present invention

FIG. 9 depicts a block diagram of an echo detector in accordance with an exemplary embodiment of the present invention. In this figure, x(n) is reference speech; y(n) is residual echo; w(n) is white noise; and v(n) is possible near-end speech. The codecs 915/920 shown here can be implemented using standard G.711, G.729AB (VAD ON/OFF) codecs. The hybrid 905 can be implemented with an ITU-T G.168 echo model 5. In VoIP, the residual echo suffers from the codec nonlinear distortion, time clipping as well as the extra delay. The block 930 measures the two major parameters on echo perception, echo path delay and echo path loss. In the measurement block 930, DTD 935 suspends the measurement when DT is detected, and VAD 945 stops the measurement when the far-end send channel is idle. G.711 and G.729AB codecs are commonly included in VoIP gateway or terminal.

There are three disclosed methods for determining the echo path delay (cross-correlation based), in accordance with disclosed embodiment. The first step in each of these is to determine the echo path delay. Here, the echo path delay is first determined using $$\hat{r}_{XY}(m) = \frac{1}{N-m} \sum_{n=0}^{N-m-1} X^*(n) \cdot Y(n+m) \quad 0 \le m < N \text{ where}$$

$$\hat{D} = \arg\max_{m} \{C_{sy}(m)\}$$

The sequences used in computation are generally greatly reduced in length or information contained.

The second step, to produce $\hat{D}$, differs in each of the three approaches.

Figure 10:
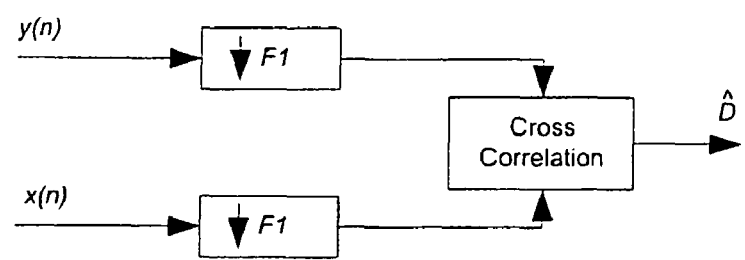
FIG. 10 illustrates the DS method in accordance with an exemplary embodiment of the present invention.

The first method includes down-sampling both the X(n) and Y(n) signals to produce the $\hat{D}$ signal (the "DS method"). FIG. 10 illustrates the DS method in accordance with an exemplary embodiment of the present invention.

Figure 11A:
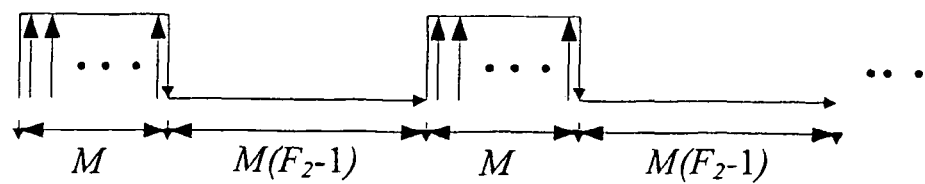
FIGS. 11A and 11B illustrate a Sparse method in accordance with an exemplary embodiment of the present invention.
Figure 11B:
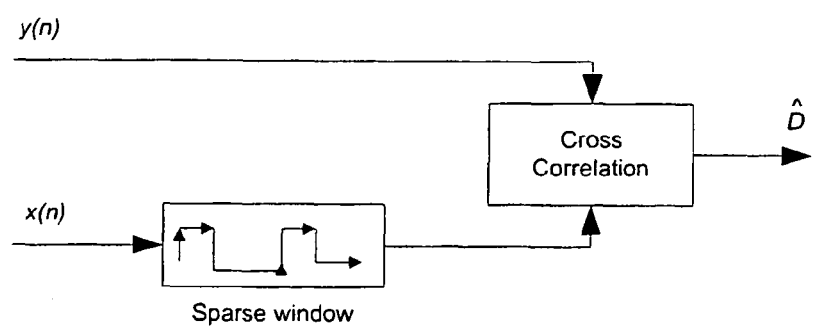

The second method, the Sparse method, includes applying a pre-defined window to one signal. FIGS. 11A and 11B illustrate a Sparse method in accordance with an exemplary embodiment of the present invention. FIG. 11A show a pre-defined window for Sparse sampling, and FIG. 11B shows a block diagram of the cross-correlation being applied.

The third method includes using the DS method and Sparse method in cascade.

The selection of methods and parameters for each method trade off between the computational complexity and measurement accuracy requirements, as shown in the following table:

| Method | Multiplication | Addition | Total Computation |
|---|---|---|---|
| Reference | $L^2$ | $L^2 - L$ | 100% |
| None-DS | $(L/F_1)^2$ | $(L/F_1)^2 - (L/F_1)$ | 1.6% ($F_1 = 8$) |
| Sparse | $L_2/F_2$ | $(L_2/F_2) - L$ | 12.5% ($F_2 = 8$) |

Next, compute the speech echo path loss (SEPL) by directly using the measured delay information, according to $$P_E = 10\log_{10}\left(10^{\frac{P_{N+E}}{10}} - 10^{\frac{P_N}{10}}\right) \text{ where } EPL = P_X - P_E$$

Unless otherwise indicated above as requiring specific hardware, the techniques and methods described herein can be implemented using the processors, memory, and other hardware already present in conventional VoIP equipment, programmed and configured to perform the described processes, as known to those of skill in the art.

Figure 12:
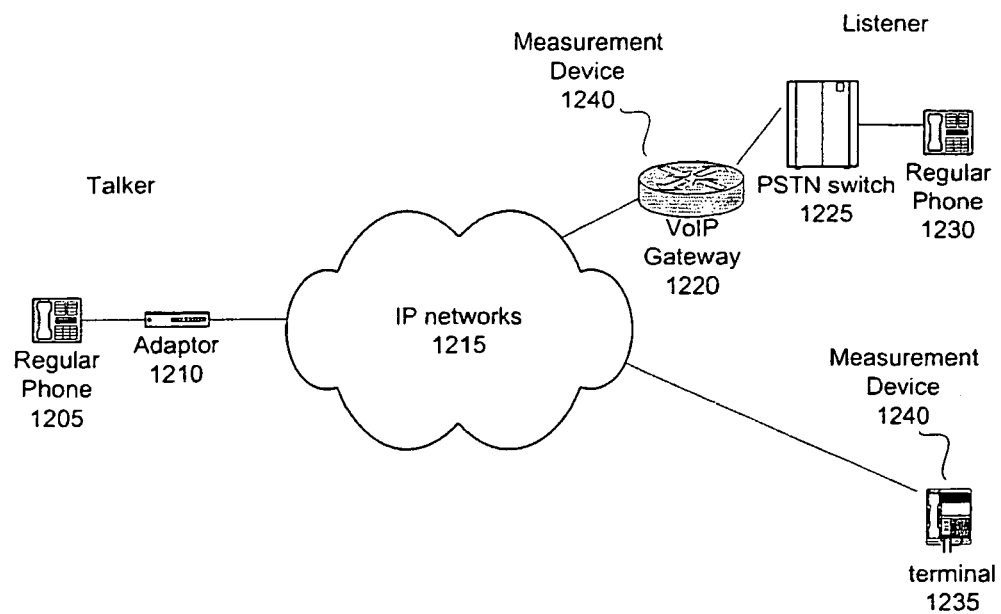
FIG. 12 illustrates a system in which the various embodiments can be implemented.

FIG. 12 depicts a hardware context in which the various disclosed embodiments can be implemented. This figure illustrates the scenario of a typical PSTN-to-PSTN call through VoIP services, using the disclosed techniques. At the talker side, the regular telephone 1205 is plugged into an adaptor 1210, which converts the voice signals into IP packets. These packets are sent into IP networks 1215, such as the Internet. Finally, the call is terminated at the listener side, where the VoIP gateway 1220 interfaces between IP networks 1215 and PSTN switch 1225 and transcodes the voice streams for regular phone 1230.

To assess the listener's perception of the VoIP speech quality, the measurement device 1240 is deployed at the VoIP gateway 1220. In case of a PSTN-to-IP call, the device is deployed at the IP terminal 1235 directly.

In either case, the measurement device 1240 is configured to perform one or more of the voice quality measurements described in detail above. Unless otherwise described above, there is no specific hardware requirement to implement the measurement device 1240. In some embodiments, all implementations are done in software using existing VoIP hardware. In other embodiments, these elements are implemented by an ASIC (application specific integrated circuit) or other suitable hardware implementation, as will be recognized by those of skill in the art. A significant feature of the disclosed embodiments is that assessing voice quality is undertaken only at the receiver side without any sort of handshaking required with the transmitting side.

In various embodiments, the system characterizes the sources of received voice degradation. Upon identifying those sources, the resources available (such as memory and processing power) in the receiver can be utilized in a more efficient way. For example, if no packet loss is seen to occur, the packet loss concealment functionality may be stopped and its resources can be directed somewhere else.

As such, corresponding embodiments will analyze the VoIP signal to detect the presence of multiple types of impairment, then evaluate an amount of degradation in the VoIP signal caused by the impairment and estimate the voice quality of the VoIP signal according to the amount of degradation for only those types of impairment that are detected, thereby saving system resources by not performing evaluations and estimates on types of impairment that are not detected.

Those skilled in the art will appreciate that at least portions of the mechanism of the present invention are capable of being distributed as a computer program product in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for voice quality estimation in a VoIP system, comprising:
   detecting an impairment in a received VoIP signal having a series of packets, where an original signal corresponding the received VoIP signal is not available, wherein detecting the impairment further comprises,
       calculating the average energy of each packet of the received VoIP signal;
       determining an energy threshold value of silence for the received VoIP signal;
       for every packing having an energy value less than the energy threshold value, replacing the energy value with the energy threshold value to produce a modified VoIP signal corresponding to the received VoIP signal;
       calculating the inverse of the energy of the modified VoIP signal; and
       identifying lost packets in the received VoIP signal by identifying peaks in the inverse of the energy of the modified VoIP signal;
   evaluating an amount of degradation in the received VoIP signal caused by the impairment; and
   estimating the voice quality of the received VoIP signal according to the amount of degradation.

2. A method for voice quality estimation in a VoIP system, comprising:
   detecting an impairment in a received VoIP signal having a series of packets, where an original signal corresponding the received VoIP signal is not available, wherein detecting the impairment further comprises,
       calculating the cross-correlation of each packet of the received VoIP signal and the previous packet of the received VoIP signal;
       monitoring the value of cross-correlation with no shift of each packet of the received VoIP signal and the previous packet of the received VoIP signal; and
       identifying a lost packet whenever the value of the cross-correlation with no shift exceeds a threshold;
   evaluating an amount of degradation in the received VoIP signal caused by the impairment; and
   estimating the voice quality of the received VoIP signal according to the amount of degradation.

3. The method of claim 1, wherein evaluating an amount of degradation in the received VoIP signal further comprises:
  estimating the original energy of at least one lost packet of the received VoIP signal;
  calculating the percentage of the estimated lost energy to the total energy in the received VoIP signal;
  determining the amount of degradation in the received VoIP signal according to the percentage of the estimated lost energy.

4. The method of claim 3, wherein estimating the voice quality of the received VoIP signal further comprises subtracting a score corresponding to the amount of degradation of an ideal voice quality score to produce a degraded voice quality score.

5. A method for voice quality estimation in a VoIP system, comprising:
  detecting an impairment in a received VoIP signal having a series of packets, where an original signal corresponding the received VoIP signal is not available, wherein detecting the impairment further comprises,
    calculating the sum of the absolute amplitudes for each packet of the received VoIP signal;
    selecting an initial threshold;
    comparing each sum with the threshold;
    for each sum that is less than the threshold, replacing the sum with the threshold to produce a modified signal;
    if the sums of the modified signal are substantially the same as the sums of the received VoIP signal, then increasing the threshold and repeating the process from the comparing step; and
    storing the threshold as a VAD threshold estimate;
  evaluating an amount of degradation in the received VoIP signal caused by the impairment; and
  estimating the voice quality of the received VoIP signal according to the amount of degradation.

6. A method for voice quality estimation in a VoIP system, comprising:
  detecting an impairment in a received VoIP signal having a series of packets, where an original signal corresponding the received VoIP signal is not available;
  evaluating an amount of degradation in the received VoIP signal caused by the impairment, wherein the evaluating an amount of degradation further comprises,
    identifying the location of a plurality of silent replaced packets of the received VoIP signal;
    classifying each of the plurality of the silent replaced packets as front-end clipping, middle-speech clipping, and back-end clipping;
    calculating a voice quality score according to the percentage of packets of the received VoIP signal that are classified as each of front-end clipping, middle-speech clipping, and back-end clipping; and
  estimating the voice quality of the received VoIP signal according to the amount of degradation.

7. A telecommunications apparatus, comprising:
  a processor configured to receive a VoIP signal comprising a series of packets; and
  a memory, accessible by the processor, the memory storing packet data corresponding to the series of packets, wherein the processor is configured to:
  detect an impairment in the VoIP signal, where an original signal corresponding to VoIP signal is not available;
  evaluate an amount of degradation in the VoIP signal caused by the impairment;
  estimate the voice quality of the VoIP signal according to the amount of degradation; and
  wherein the processor is further configured to:
    calculate the average energy of each packet of the VoIP signal;
    determine an energy threshold value of silence for the VoIP signal;
    replace the energy value with the energy threshold value to produce a modified VoIP signal corresponding to the VoIP signal, for every packing having an energy value less than the energy threshold value;
    calculate the inverse of the energy of the modified VoIP signal; and
    identify lost packets in the VoIP signal by identifying peaks in the inverse of the energy of the modified VoIP signal.

8. A telecommunications apparatus, comprising:
  a processor configured to receive a VoIP signal comprising a series of packets; and
  a memory, accessible by the processor, the memory storing packet data corresponding to the series of packets, wherein the processor is configured to:
  detect an impairment in the VoIP signal, where an original signal corresponding to VoIP signal is not available;
  evaluate an amount of degradation in the VoIP signal caused by the impairment;
  estimate the voice quality of the VoIP signal according to the amount of degradation; and
  wherein the processor is further configured to:
    calculate the cross-correlation of each packet of the VoIP signal and the previous packet of the VoIP signal;
    monitor the value of cross-correlation with no shift of each packet of the VoIP signal and the previous packet of the VoIP signal; and
    identifying a lost packet whenever the value of the cross-correlation with no shift exceeds a threshold.

9. The telecommunications apparatus of claim 7, wherein the processor is further configured to:
  estimate the original energy of at least one lost packet of the VoIP signal;
  calculate the percentage of the estimated lost energy to the total energy in the VoIP signal;
  determine the amount of degradation in the VoIP signal according to the percentage of the estimated lost energy.

10. The telecommunications apparatus of claim 9, wherein the processor is further configured to subtract a score corresponding to the amount of degradation of an ideal voice quality score to produce a degraded voice quality score.

11. A telecommunications apparatus, comprising:
  a processor configured to receive a VoIP signal comprising a series of packets; and
  a memory, accessible by the processor, the memory storing packet data corresponding to the series of packets, wherein the processor is configured to:
  detect an impairment in the VoIP signal, where an original signal corresponding to VoIP signal is not available;
  evaluate an amount of degradation in the VoIP signal caused by the impairment;
  estimate the voice quality of the VoIP signal according to the amount of degradation; and
  wherein the processor is further configured to:
    calculate the sum of the absolute amplitudes for each packet of the received VoIP signal;
    select an initial threshold; compare each sum with the threshold;
    for each sum that is less than the threshold, replace the sum with the threshold to produce a modified signal;

if the sums of the modified signal are substantially the same as the sums of the VoIP signal, then increase the threshold and repeating the process from the comparing step; and store the threshold as a VAD threshold estimate.

12. A telecommunications apparatus, comprising:
a processor configured to receive a VoIP signal comprising a series of packets; and
a memory, accessible by the processor, the memory storing packet data corresponding to the series of packets, wherein the processor is configured to:
detect an impairment in the VoIP signal, where an original signal corresponding to VoIP signal is not available;
evaluate an amount of degradation in the VoIP signal caused by the impairment;
estimate the voice quality of the VoIP signal according to the amount of degradation; and
wherein the processor is further configured to:
identify the location of a plurality of silent replaced packets of the VoIP signal;
classify each of the plurality of the silent replaced packets as front-end clipping, middle-speech clipping, and back-end clipping;
calculate a voice quality score according to the percentage of packets of the VoIP signal that are classified as each of front-end clipping, middle-speech clipping, and back-end clipping.

* * * * *